United States Patent [19]

Hartung et al.

[11] Patent Number: 5,368,944
[45] Date of Patent: Nov. 29, 1994

[54] PROCESS FOR THE PRODUCTION OF A MULTICOAT PROTECTIVE AND/OR DECORATIVE FINISH

[75] Inventors: Michael Hartung, Geseke; Walter Lassmann, Münster; Ulrich Poth, Münster; Egon Wegner, Münster, all of Germany

[73] Assignee: BASF Lacke + Farben Aktiengesellschaft, Munster, Germany

[21] Appl. No.: 108,661
[22] PCT Filed: Feb. 1, 1992
[86] PCT No.: PCT/EP92/00220
§ 371 Date: Sep. 3, 1993
§ 102(e) Date: Sep. 3, 1993
[87] PCT Pub. No.: WO92/15405
PCT Pub. Date: Sep. 17, 1992

[30] Foreign Application Priority Data

Mar. 6, 1991 [DE] Germany .................. 4107136

[51] Int. Cl.$^5$ .................. B32B 27/00; B32B 27/40
[52] U.S. Cl. .................. 428/423.1; 427/407.1; 427/409; 427/412.1; 428/425.8; 528/49; 528/69; 528/73
[58] Field of Search .................. 427/407.1, 409, 412.8; 428/423.1, 425.8; 528/49, 69, 73

[56] References Cited

U.S. PATENT DOCUMENTS

| | | | |
|---|---|---|---|
| 4,652,494 | 3/1987 | Bravet et al. | 428/423.1 |
| 4,719,132 | 1/1988 | Porter | 427/409 |
| 4,879,365 | 11/1989 | Petschke et al. | 528/49 |
| 5,204,379 | 4/1993 | Kabota et al. | 522/96 |

FOREIGN PATENT DOCUMENTS

| | | |
|---|---|---|
| 197170 | 10/1986 | European Pat. Off. . |
| 297576 | 1/1989 | European Pat. Off. . |
| 369389 | 5/1990 | European Pat. Off. . |
| WO9001041 | 2/1990 | WIPO . |

OTHER PUBLICATIONS

Arendt, Volker D et al, "m and p—TMXOI: Two New Isocyanotes For The Polyarethane Industry," Journal of Cellular Plastics, Nov., Dec., 1982, pp. 376-383.

*Primary Examiner*—Michael Lusignan

[57] ABSTRACT

The invention relates to a process for the production of multicoat finishes, in which
(1) an aqueous pigmented basecoat containing a water-thinnable polyurethane resin is applied to the substrate surface as basecoat,
(2) a polymer film is formed from the coating applied in stage (1),
(3) a transparent topcoat is applied to the basecoat obtained in this way and subsequently
(4) the basecoat is baked together with the topcoat, and the water-thinnable polyurethane resin contains structural units of the formula $$-CO-NH-\underset{\underset{R^2}{|}}{\overset{\overset{R^1}{|}}{C}}-X-\underset{\underset{R^2}{|}}{\overset{\overset{R^1}{|}}{C}}-NH-CO-$$

X representing a divalent aromatic hydrocarbon radical and $R^1$ and $R^2$ representing an alkyl radical having 1 to 4 carbon atoms.

6 Claims, No Drawings

PROCESS FOR THE PRODUCTION OF A MULTICOAT PROTECTIVE AND/OR DECORATIVE FINISH

The invention relates to a process for the production of a multicoat protective and/or decorative finish in which (1) an aqueous pigmented basecoat containing a water-thinnable polyurethane resin is applied to the substrate surface as basecoat, (2) a polymer film is formed from the coating applied in stage (1), (3) a transparent topcoat is applied to the basecoat obtained in this way and subsequently (4) the basecoat is baked together with the topcoat.

This process represents the well known basecoat-clearcoat process, used above all for the preparation of high-quality finishes, especially of metallic finishes for automobile bodies. In the "wet-on-wet" process, the pigmented basecoat first applied is coated, after a brief flash-off period, with a transparent topcoat (clearcoat) without a baking stage. Both paint coats are then baked together in a single operation.

The paint industry has made great efforts to reduce the amounts of organic solvents used especially in basecoats. Aqueous basecoats have been developed which are increasingly displacing conventional basecoats comprising exclusively organic solvents.

From EP-A-89,497, German Offenlegungsschrift 3,545,618, EP-A-355,433, U.S. Pat. No. 4,719,132 and German Offenlegungsschrift 3,903,804 it is known that especially aqueous basecoats containing a water-thinnable polyurethane resin are particularly well suited for the process under discussion.

The aim of the present invention is to produce aqueous, polyurethane resin-containing basecoats which furnish improved multicoat finishes of the basecoat-clearcoat type when the process described above is used. The aim of the present invention is in particular to produce aqueous, polyurethane resin-containing basecoats which furnish refinishes with improved adhesion.

Surprisingly, it has been found that when aqueous basecoats comprising a water-thinnable polyurethane resin which contains structural units of the formula

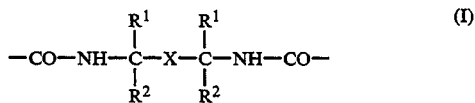

are employed, improved multicoat finishes of the basecoat-clearcoat type are obtained, X representing a divalent aromatic hydrocarbon radical, preferably a naphthylene, biphenylene, 1,2-phenylene, 1,3-phenylene or 1,4-phenylene radical, particularly preferably a 1,3-phenylene radical, each optionally substituted by halogen, methyl or methoxy, and $R^1$ and $R^2$ representing an alkyl radical having 1 to 4 carbon atoms, particularly preferably a methyl radical. The multicoat finishes obtained with these basecoats possess improved adhesion properties when used for refinishing.

EP-A-369,389 describes water-thinnable polyurethane resins which are prepared using tetramethylxylylene diisocyanate (TMXDI, 1,3- or 1,4-bis(2-isocyanatoprop-2-yl)benzene) and are said to be usable also in coating compositions. However, EP-A-369,389 makes no reference to the basecoat-clearcoat process.

Polyurethane resins containing the structural units (I) can be prepared by using diisocyanates of the general formula

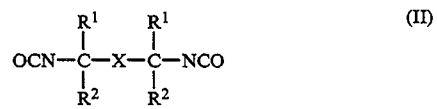

for the preparation of the polyurethane resins, $R^1$, $R^2$ and X having the same meaning as in the formula (I).

Diisocyanates of the formula (II) are known (their preparation is described, for example, in EP-A-101,832, and US Patents 3,290,350, 4,130,577 and 4,439,616) and some are commercially available (for example, 1,3-bis(2-isocyanatoprop-2-yl)benzene is marketed by American Cyanamid Company under the trade name TMXD I (META) ®).

The polyurethane resins are used in the form of aqueous dispersions. The preparation of aqueous polyurethane resin dispersions is known to a person skilled in the art and is also described, for example, in EP-A-89,497, German Offenlegungsschrift 3,545,618, EP-A-355,433, U.S. Pat. No. 4,719,132 and German Offenlegungsschrift 3,903,804.

The polyurethane resins used according to the invention are usually prepared by reacting (A) a polyester polyol and/or a polyether polyol having a number average molecular weight of 400 to 5000 or a mixture of such polyester polyols and/or polyether polyols, (B) a polyisocyanate or a mixture of polyisocyanates, at least a part of the component (B) consisting of a diisocyanate of the formula (II) or a mixture of such diisocyanates, (C) an organic compound containing hydroxyl and/or amino groups and having a molecular weight of 60 to 400 (number average) or a mixture of such compounds and, optionally, (D) a compound containing in the molecule only one group reactive towards isocyanate groups.

The polyurethane resins usually have a number average molecular weight of at least 1000. The number average molecular weight of the polyurethane resins should preferably be at least 4000, particularly preferably between 5000 and 8000.

The data on number average molecular weights cited in this application refer to measurements by gel permeation chromatography, performed with the aid of a polystyrene standard.

The incorporation of the components (C) containing amino groups is preferably carried out in such a way that a prepolymer containing NCO groups is prepared first from (A), (B) and, optionally, a component (C) containing hydroxyl groups, which prepolymer is then further reacted in the aqueous phase with a component (C) containing amino groups (cf. EP-A-89,497).

The stabilization of the aqueous polyurethane resin dispersions can be effected nonionically, ionically or both ionically and nonionically. Poly(oxyalkylene) groups in particular can be introduced into the polyurethane resin molecules as nonionically stabilizing groups. These poly(oxyalkylene) groups can be introduced into the polyurethane resin molecules both via the component (A) and via the components (C) containing poly- (oxyalkylene) groups. Anionically stabilized polyurethane resin dispersions are used for preference. The groups capable of forming anions, preferably carboxyl groups, can be introduced into the polyurethane resin molecules via the component (A) (in particular as polyester polyols containing carboxyl groups as described in German Offenlegungsschrift 3,903,804) and/or via the component (C). For the stabilization of the polyurethane resin dispersions used according to the invention it is preferred to use the components (C) containing carboxyl groups. It is preferred that the polyurethane resins have an acid value of 7 to 50, preferably 15 to 35.

The polyurethane resin dispersions according to the invention are preferably prepared by preparing from the components (A), (B) and, if appropriate, (C) a prepolymer containing isocyanate groups which is then reacted with a component (C) containing at least three hydroxyl groups. The carboxyl groups are then neutralized with the aid of, preferably, tertiary amines and the polyurethane resin is dispersed in water. The reaction with the components (C) containing amino groups is less preferred (cf. German Offenlegungsschrift 3,545,618).

The polyester polyols and polyether polyols usable as the component (A), which are preferably polyester diols and polyether diols, are described in detail in EP-A-89,497, German Offenlegungsschrift 3,545,618, EP-A-355,433, U.S. Pat. No. 4,719,132 and German Offenlegungsschrift 3,903,804. Polyester diols are preferably used as the component (A). The component (A) is preferably employed in amounts which represent 50 to 80, particularly preferably 60 to 70 by weight, % of the polyurethane resin, the percentages by weight referring to the solids content of the polyurethane resin dispersion.

A diisocyanate of the formula (II) or a mixture of such diisocyanates is used as the component (B). Other aliphatic and/or cycloalipatic [sic] and/or aromatic polyisocyanates can also be used in addition to the diisocyanates of the formula (II). Examples of additionally usable polyisocyanates are phenylene diisocyanate, tolylene diisocyanate, xylylene diisocyanate, bisphenylene diisocyanate, naphthylene diisocyanate, diphenylmethane diisocyanate, isophorone diisocyanate, cyclopentylene diisocyanate, cyclohexylene diisocyanate, methylcyclohexylene diisocyanate, dicyclohexylmethane diisocyanate, trimethylene diisocyanate, tetramethylene diisocyanate, pentamethylene diisocyanate, hexamethylene diisocyanate, propylene diisocyanate, ethylethylene diisocyanate and trimethylhexane diisocyanate. Polyisocyanates having functionalities higher than two can also be used in addition to diisocyanates. In this case, however, care must be taken that no crosslinked polyurethane resins are obtained. If desired, the average functionality can be lowered by using at the same time monoisocyanates.

It is preferred to use as the component (B) exclusively a diisocyanate of the formula (II) or a mixture of such diisocyanates. It is particularly preferred to use as the components (B) a diisocyanate of the formula

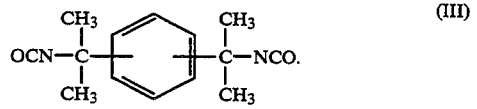

(III)

These diisocyanates are des ignited as tetramethylxylylene diisocyanates ( TMXDI ). A diisocyanate of the formula (III) in which the —C(CH3)2 NCO groups are in the meta position (m TMXDI) is very particularly preferred as the component (B).

Examples of polyols which can be used as the component (C) are those which contain up to 44 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, di(trimethylolpropane) ether, pentaerythritol, 1,2-cyclohexanediol, 1,4-cyclohexanedimethanol, bisphenol A, bisphenol F, neopentyl glycol, neopentyl glycol ester of hydroxypivalic acid, hydroxyethylated or hydroxypropylated bisphenol A, and hydrogenated bisphenol A and mixtures thereof. Groups capable of forming anions, such as carboxyl, sulphonic acid and/or phosphonic acid groups, can also be introduced into the polyurethane resin molecules via the component (C). Carboxyl groups are preferably introduced into the polyurethane resin molecules via the component (C). This can be effected, for example, with the aid of dihydroxypropionic acid, dihydroxysuccinic acid and dihydroxybenzoic acid. Preferred components (C) for introducing carboxyl groups into the polyurethane resin molecules are α,α-dimethylolalkanoic acids, such as 2,2-dimethylolacetic acid, 2,2-dimethylolpropionic acid, 2,2-dimethylolbutyric acid and 2,2-dimethylolpentanoic acid. Carboxyl groups can also be introduced via the components (C) containing amino groups, such as α,ε-diaminovaleric acid and 3,4-diaminobenzoic acid. The use of the components (C) containing amino groups is less preferred.

Compounds having a molecular weight of 60 to 400 (number average) which contain either a hydroxyl or a primary amino or a secondary amino group, can be used in particular as the component (D). Aliphatic alcohols having 1 to 6 carbon atoms, such as methanol, ethanol, propanol, butanol, pentanol or hexanol, are preferably used as the component (D).

Both organic and inorganic bases can be used to neutralize the groups capable of forming anions. Primary, secondary and tertiary amines, such as ethylamine, propylamine, dimethylamine, dibutylamine, cyclohexylamine, benzylamine, morpholine, piperidine and triethanolamine, are used for preference. Tertiary amines, especially dimethylethanolamine, triethylamine, tripropylamine and tributylamine, are used particularly preferably as the neutralizing agents.

A person skilled in the art is aware of a number of possibilities for influencing the molecular weight of the polyurethane resins. For example, the molecular weight can be influenced by the ratio between the equivalents of NCO groups used and the equivalents of groups reactive towards NCO groups used in the components (A), (C) and (D). Furthermore, the molecular weight can be regulated via the reaction of a prepolymer prepared from (A), (B) and, if appropriate, (C) and containing NCO groups with the component (C) by the amount of the component (C) used. (C) functions as end group former or chain extender, depending on the ratio between the equivalents of free NCO groups and hydroxyl or amino groups from the component (C). The molecular weight can also be regulated by terminating the reaction at the point in time at which the desired molecular weight has been reached. The reaction can be terminated, for example, by a rapid lowering of the reaction temperature and/or by the addition of a coreactant which reacts with any isocyanate groups still present, without any chain extension taking place (for example water, the component (D) or the component (C) in a large excess).

The aqueous polyurethane resin dispersions to be used according to the invention can be processed by a person skilled in the art to form aqueous solid-color basecoats or aqueous metallic basecoats. Other water-thinnable synthetic resins, such as amino resins, polyacrylate resins, polyester resins and polyether resins, can of course be used in addition to the aqueous polyurethane resin dispersions under discussion.

The basecoats should in general contain 5 to 90, preferably 40 to 70% by weight of the polyurethane resins according to the invention, the percentages by weight referring to the total solids content of the basecoats.

The basecoats according to the invention can contain as pigments colored inorganic pigments, such as titanium dioxide, iron oxide, carbon black etc., colored organic pigments and conventional metal pigments (for example commercial aluminum bronzes, stainless steel bronzes . . . ) and non-metallic effect pigments (for example nacreous luster pigments or interference pigments). The degree of pigmentation is at the customary levels.

In addition, crosslinked polymeric microparticles, such as those disclosed, for example, in EP-A-38,127, and/or conventional inorganic or organic additives can be added to the basecoats according to the invention. Thus, for example, the following act as thickeners: water-soluble cellulose ethers, such as hydroxyethylcellulose, methylcellulose or carboxymethylcellulose, or synthetic polymers containing ionic and/or associatively acting groups, such as polyvinyl alcohol, poly(meth)acrylic acid, polyvinylpyrrolidone, styrenemaleic anhydride or ethylene-maleic anhydride copolymers and derivates thereof as well as hydrophobically modified ethoxylated urethanes or polyacrylates, and polyacrylate copolymers containing carboxyl groups and having an acid value of 60 to 780, preferably 200 to 500.

In general, the basecoats according to the invention have a solids content of about 15 to 50% by weight. For metallic paints it is preferably 17 to 25% by weight. For solid-color paints it is higher, for example 30 to 45% by weight. The paints according to the invention can additionally contain conventional organic solvents, their amounts being kept as low as possible. They are, for example, below 15% by weight.

The pH of the basecoats according to the invention is in general adjusted to between 6.5 and 9.0. The pH can be adjusted using conventional amines, such as ammonia, triethyleneamine, dimethylaminoethanol and N-methylmorpholine.

The basecoats according to the invention can be coated with aqueous, conventional or powder clearcoats. Suitable clearcoats are well known to a person skilled in the art and are described, for example, in EP-A-89,497, U.S. Pat. No. 4,719,132 and EP-A-38,127. Two-component clearcoats based on hydroxyl-containing binders (in particular hydroxyl-containing polyacrylate resins) and polyisocyanates as crosslinking agents are usually used for refinishing. The term refinishing is understood to mean the repair of original finishes using a fresh coating of basecoat and clearcoat and joint baking of the overcoated basecoat and clearcoat. Refinishing can be effected shortly after the original finishing on the production line as well as after the automobile has been built. In the first case the baking temperatures used are generally up to 140° C (high-bake refinishing), in the second case baking temperatures of up to about 80° C. (lowbake refinishing) are generally used. By using the basecoats according to the invention it is possible to produce refinishes which possess improved adhesion especially to original finishes which have not been pretreated, for example, by sanding.

The improved adhesion between the clearcoat and basecoat films is particularly apparent when 2-component clearcoats based on hydroxyl- and carboxyl-containing polyacrylate resins and polyisocyanates are used, the polyacrylate resins having been prepared from at least one alkyl (meth)acrylate having 1 to 18 carbon atoms in the alkyl radical, from at least one hydroxyl-containing monomer such as hydroxyethyl (meth)acrylate, hydroxypropyl (meth)acrylate or hydroxybutyl (meth)acrylate, from at least one carboxyl-containing monomer such as (meth)acrylic acid and, if appropriate, from at least one further copolymerizable monomer such as styrene, and having number average molecular weights of 2500 to 10 000, hydroxyl values of 70 to 180, preferably 100 to 160 and acid values of 4 to 30, preferably 10 to 25.

The basecoats according to the invention can be applied to any substrate such as metal, wood, plastic or paper by spraying, blade coating, dipping or rolling. They can be applied direct or only after a suitable primer has been applied. In the finishing of automobile bodies the basecoats are usually applied over the body filler coat.

The examples below elucidate the invention in greater detail. All percentages and parts are by weight unless expressly stated otherwise.

1. Preparation of polyurethane resin dispersions 1.1. A mixture of 798 g of a polyester diol having a number average molecular weight of 1400, prepared from hydrogenated dimerized fatty acid (Pripol 1009, commercial product from Unichema International), 1,6-hexanediol and phthalic anhydride), 12.5 g of 1,6-hexanediol, 65 g of dimethylolpropionic acid and 516.6 g of methyl ethyl ketone is introduced into a 6 l reaction vessel fitted with a stirrer, reflux condenser and 2 feed vessels. 299 g of isophorone diisocyanate (IPDI) are added to this mixture. The reaction is then allowed to proceed at 82° C. until the isocyanate content has dropped to 1% by weight. The reaction mixture is then treated with 31 g of trimethylolpropane and the mixture is kept further at 82° C. The rise in viscosity of the reaction mixture is then followed by treating each time 10 ml of the reaction mixture with 10 ml of N-methylpyrrolidone and measuring the viscosity of this sample solution at 23° C. using a plate-cone viscometer. As soon as the sample solutions obtained by this procedure reach a viscosity of 5 dPas (after about 5 hours), the reaction is terminated by the addition of 54 g of butanol. The resultant reaction product is then treated with 38 g of dimethylethanolamine and 3254 g of deionised water over 2 hours with vigorous stirring. Finally the methyl ethyl ketone is distilled off in vacuo. The resultant aqueous polyurethane resin dispersion has a solids content of 27% by weight.

1.2. The procedure described in section 1.1 is followed except that 353 g of 4,4'-di(isocyanatocyclohexyl)methane are used instead of 299 g of IPDI and 539.7 g of methyl ethyl ketone are used instead of 516.6 g of methyl ethyl ketone.

1.3. The procedure described in section 1.1 is followed except that 329 g of 1,3-bis(2-isocyanatoprop-2-yl)benzene (m-TMXDI) are used instead of 299 g of IPDI and 529.5 g of methyl ethyl ketone are used instead of 516.6 g of methyl ethyl ketone.

2. Preparation of an aqueous polyester resin dispersion 729 parts by weight of neopentyl glycol, 827 parts by weight of hexanediol, 462 parts by weight of hexahydrophthalic anhydride and 1710 parts by weight of a polymeric fatty acid (dimer content at least 98% by weight, trimer content not more than 2% by weight, monomer content not more than traces) are weighed into a reaction vessel fitted with a stirrer, a thermometer and a packed column and the mixture is melted. It is then heated with stirring at such a rate that the temperature at the head of the column does not exceed 100° C. Esterification is allowed to proceed at not more than 220° C. until an acid value of 8.5 is reached. The reaction mixture is cooled to 180° C., 768 parts by weight of trimellitic anhydride are added and esterification is continued until an acid value of 30 is reached. The mixture is then cooled to 120° C. and partly dissolved by the addition of 1410 parts by weight of butanol. The mixture is cooled to 90° C. and 16.2 parts by weight of dimethylethanolamine are added slowly with stirring, followed by 1248 parts by weight of deionized water. A finely divided dispersion is obtained having a pH of 7.8, a non-volatile content of 60% by weight and an acid value of 30 mg of KOH/g.

3. Preparation of the basecoats

Using the polyurethane resin dispersions prepared in sections 1.1, 1.2 and 1.3, 3 basecoats are prepared by introducing 33.5 parts by weight of a thickener (a 3% paste in water of sodium magnesium silicate with a stratified structure) into the reaction vessel and then adding a solution of 3.4 parts by weight of butyl glycol and 6.0 parts by weight of a 90% solution of a commercial water-thinnable melamine-formaldehyde resin in isobutanol (Cymel 327 ®, commercial product from American Cyanamid Company) with vigorous stirring (dissolver). This mixture is then treated with 33.3 parts by weight of the polyurethane resin dispersion with vigorous stirring. An aluminum pigment slurry is prepared separately as follows: 6.0 parts by weight of butyl glycol are added to 4.4 parts by weight of a commercial chromated aluminum paste (65% in petroleum ether/solvent naphtha/butyl alcohol, average particle diameter: 15 μm) and the mixture is homogenized. This slurry is then treated with 6.4 parts by weight of the polyester resin dispersion from section 2. This aluminum pigment slurry is stirred into the mixture described above. 6.5 parts by weight of deionized water are then added and the pH is adjusted to 7.65–7.85 with a solution (10% in water) of dimethylethanolamine.

4. Application and testing of the aqueous basecoats

The aqueous basecoats prepared in section 3 are adjusted with distilled water to an application solids content of 24.2% by weight and are applied with the aid of a pneumatic spray gun to a phosphated steel panel coated with a commercial electrocoating finish and a commercial body filler in such a way that a dry film thickness of 13–16 μm is obtained. The applied basecoats are dried for 10 minutes in a circulating air oven at 80° C. These coats are then coated with a commercial 2-component clearcoat based on polyacrylate/polyisocyanate and are baked for 20 minutes in a circulating air oven at 140° C. The panels coated in this manner are again coated with the basecoats and then, after a predrying period, with a commercial 2-component clearcoat, suitable for refinishing purposes, based on polyacrylate/polyisocyanate. The refinishes obtained in this way are finally baked for 40 minutes in a circulating air oven at 80° C.

The dry film thickness of the clearcoats is about 40 μm. After exposure for 240 hours to a constant temperature humidity test according to DIN 50 017 the finishes exhibited high gloss and a good metallic effect. However, an adhesion test according to DIN 53 151, including the Tesa pull-off test, performed one hour after exposure to the constant temperature humidity test indicates that the finish produced using the basecoat which contains the polyurethane resin dispersion prepared in section 1.3 has a distinctly better adhesion between the first and second coats than the finishes produced using the basecoats which contain the polyurethane resin dispersions prepared in sections 1.1 and 1.2.

We claim:

1. Process for the production of a multi-layer coating in which
   (1) an aqueous pigmented basecoat containing a water-thinnable polyurethane resin is applied to the substrate surface as basecoat,
   (2) a cured polymer film is formed from the coating applied in stage (1),
   (3) a transparent topcoat is applied to the basecoat obtained in this way and subsequently
   (4) the basecoat is baked together with the topcoat, characterized in that the water-thinnable polyurethane resin contains structural units of the formula

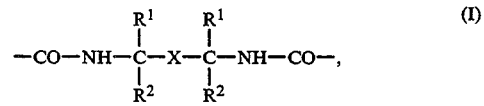

X representing a divalent aromatic hydrocarbon radical and $R^1$ and $R^2$ representing an alkyl radical having 1 to 4 carbon atoms.

2. A process according to claim 1, characterized in that X represents a phenylene radical.

3. A process according to claim 1, characterized in that the water-thinnable polyurethane resin has a number average molecular weight of 4000 to 8000.

4. An article comprising a structure having a coating thereon wherein said coating is a multilayer coating including at least one basecoat layer, and at least one clearcoat layer applied over the basecoat layer wherein the basecoat is derived from an aqueous pigmented paint comprising a water-thinnable polyurethane resin which contains structural units of the formula.

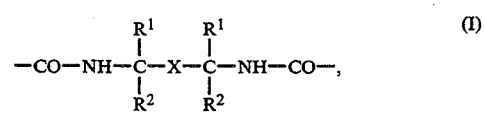

X representing a divalent aromatic hydrocarbon radical and $R^1$ and $R^2$ representing an alkyl radical having 1 to 4 carbon atoms, as basecoat for the production of a multicoat finish of the basecoat-clearcoat type.

5. A coated article according to claim 4, wherein the coating is characterized in that X represents a phenylene radical.

6. A coated article according to claim 4, wherein the coating is characterized in that the water-thinnable polyurethane resin has a number average molecular weight of 4000 to 8000.

* * * * *